United States Patent Office 3,297,338
Patented Jan. 10, 1967

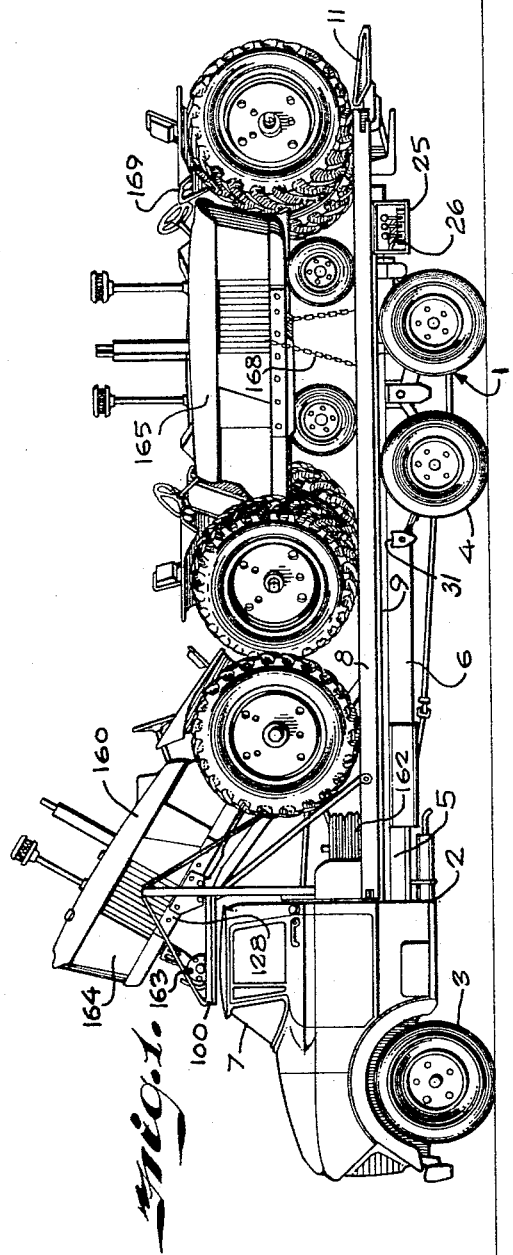

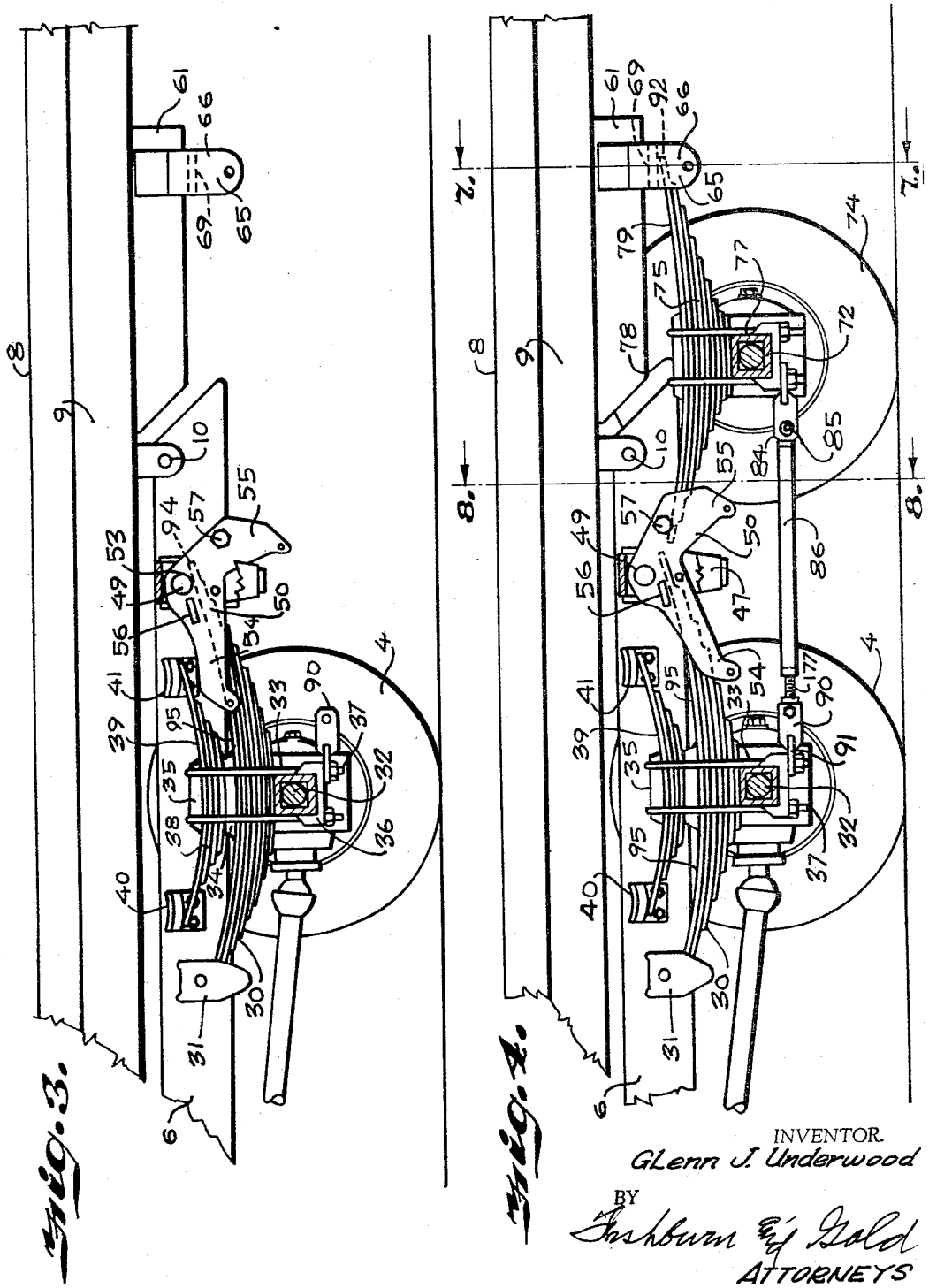

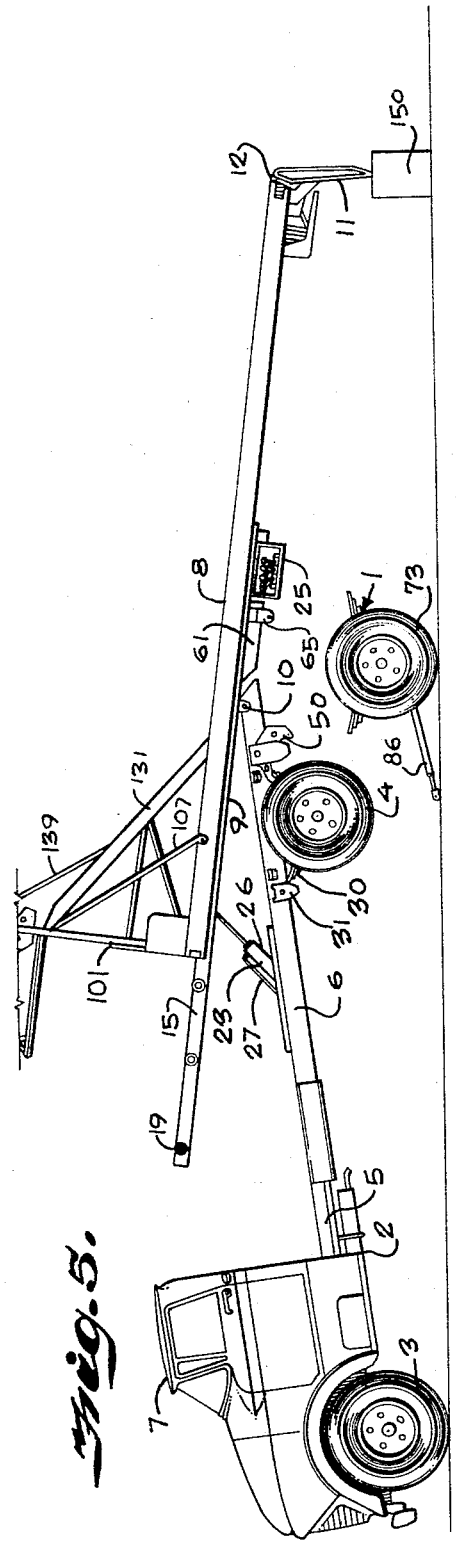
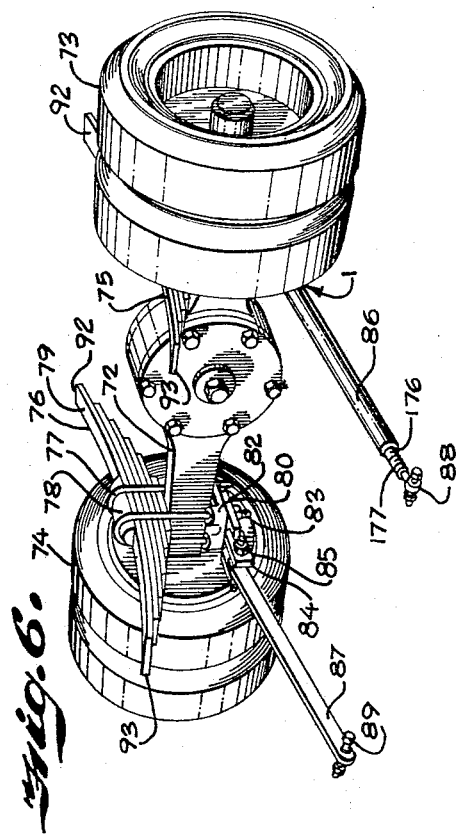

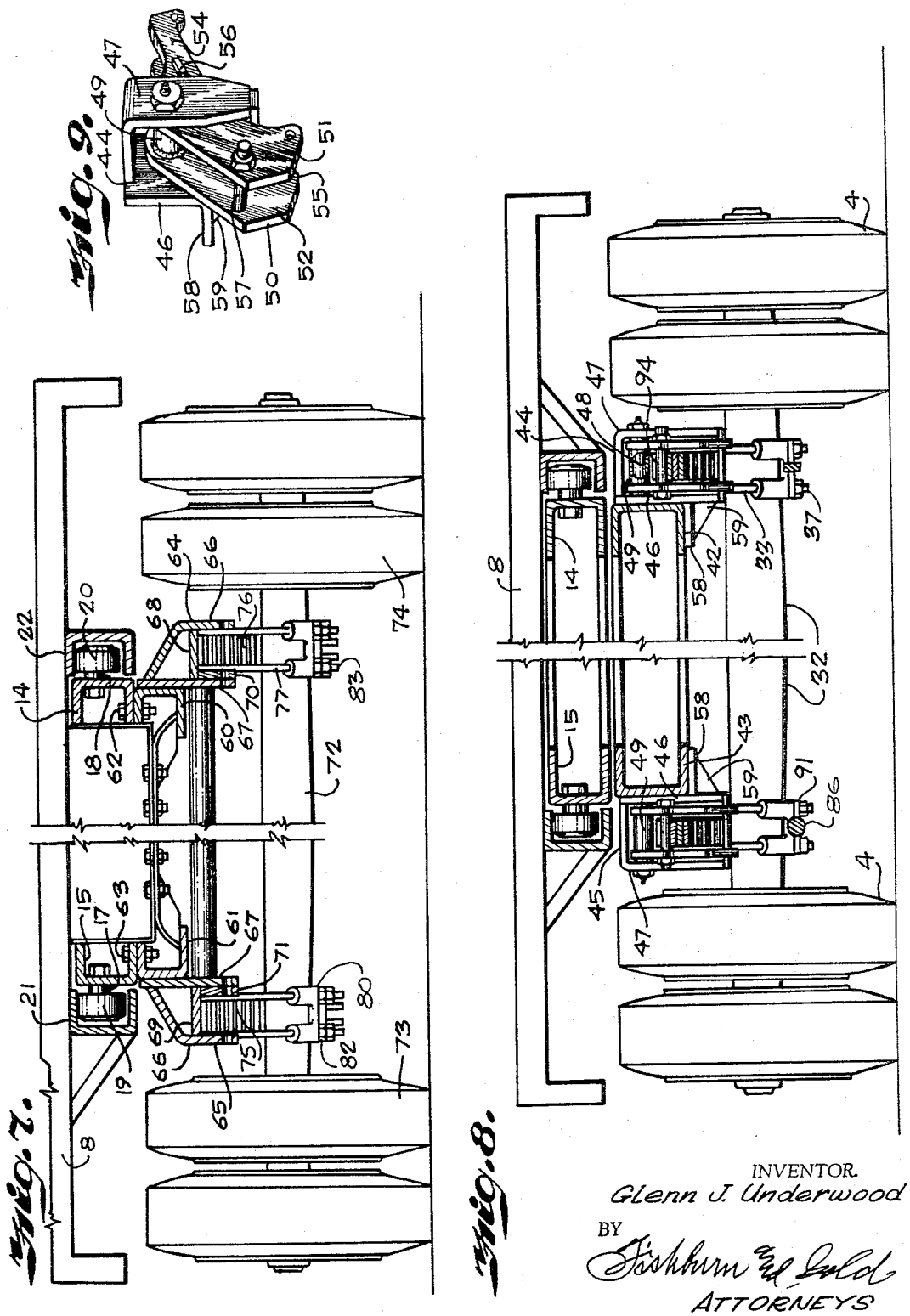

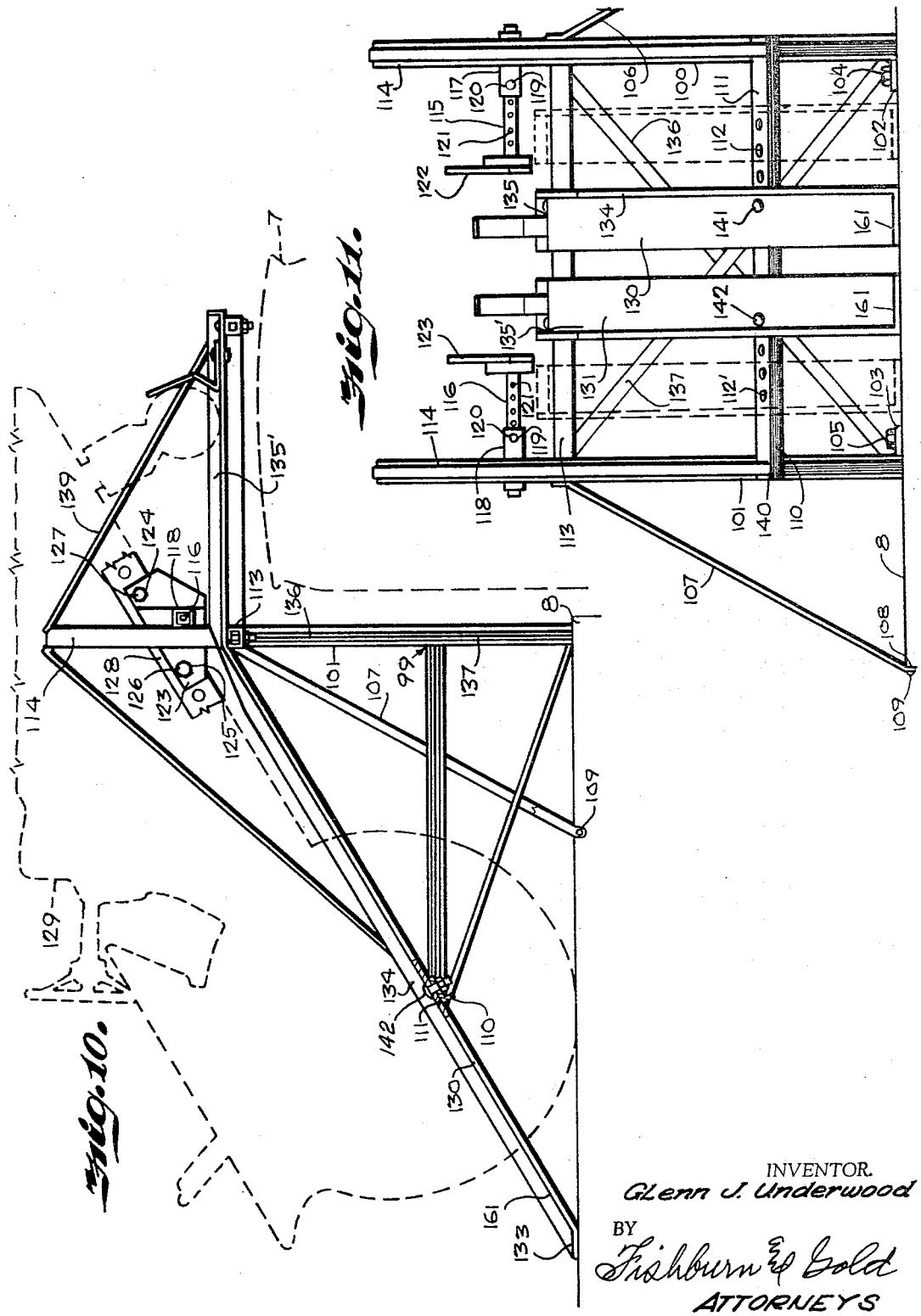

3,297,338
TAG WHEEL APPARATUS FOR TRUCK BEDS WITH EQUALIZER
Glenn J. Underwood, 1214 S. Hickory, Ottawa, Kans. 66067
Filed Sept. 14, 1964, Ser. No. 396,260
12 Claims. (Cl. 280—104.5)

This invention relates to truck attachments and more particularly to a tag axle for truck beds and apparatus for loading and storing tractors and other equipment or materials which due to their shapes and weights cannot be otherwise loaded in such a manner as to equalize the weight on the truck axles to utilize the full capacity of the truck and still comply with the axle load limit regulations.

With present day equipment it is impossible to load two tractors on a truck bed without overloading the rear axle. My attachment for trucks is particularly adapted for any straight truck like illustrated in Patents Nos. 2,998,890 and 3,066,816 of September 5, 1961 and December 4, 1962, respectively, or any other truck having a tilting bed.

The principal object of the present invention is to provide a tag axle for a truck bed or body which may be quickly and easily attached and detached therefrom.

Other objects of the present invention are to provide mechanism for loading and unloading heavy objects such as tractors on a truck bed or transport vehicle to which the tag axle has been attached.

The truck or vehicle to which my improvements are to be attached and in which they are adapted to be used may be constructed with a tilting frame mounted thereon and means are provided for raising and lowering the frame with respect to the chassis. This feature is accomplished hydraulically by a fluid system driven by the vehicle engine as is the usual practice, or by other means also now in common use. More specifically, the arrangement for loading the tractors on the truck body is to provide for compactness in arrangement on the body so as to handle three tractors where heretofore only two have been accommodated on such truck, and to have proper weight distribution as required by law.

Still further objects of the present invention are to provide a tag axle with the usual ground wheels and spring members and having forwardly extending members which may be attached to the rear of the regular axle of the truck wherein the attaching and detaching processes are easier to perform; to provide a depending bracket or box member rigidly attached to the outside of the respective side members of the truck frame open forwardly and rearwardly of the truck; to provide an equalizing bar pivotally mounted in said bracket and having an arm extending forwardly and an arm extending rearwardly of the bracket; to provide a plate extending across said bracket slightly forwardly and below the pivoted point or shaft in said bracket; to provide a stop member on said rearwardly extending arm of the equalizing bar; to provide means on said truck body rearwardly of the tag axle and wheels for engagement of the top leaf of the springs on said axle, the forward uppermost leaf of said springs engaging under the stop member on the rearwardly extending arm of said equalizer bar; and to provide means whereby the rear portion of the top leaf of the springs on the regular axle of the truck will selectively engage the shaft in said brackets or said plate extending thereacross.

Still further objects of the present invention are to provide hydraulic means carried by the truck for raising the rear wheels and axles of the truck from the ground for easy placement of the tag axle thereunder and then lowering the rear wheels to the ground.

Still further objects of the present invention are to provide a framework structure rigidly attached to the forward portion of the truck bed whereby the front wheels of the first tractor are supported above the cab and the main or rear wheels of the tractor closely adjacent to the cab; to provide for loading the next tractor with the rear end against the rear portion of the first tractor and at an angle with respect thereto; to provide means for loading the third tractor in parallel arrangement to the first tractor with the front end thereof against the forward portion of the one rear wheel of the second tractor to conserve space; to provide for adjustment of the track on said framework structure laterally to accommodate single wheel row crop or adjustable tread front axle spaced wheels on the front of the first tractor; and to provide a device of this character simple and economical to manufacture.

Other objects and advantages of this invention will become apparent from the following description taken in connection with the accompanying drawings wherein are set forth by way of illustration and example certain embodiments of this invention.

FIG. 1 is a side view of a truck loaded with three tractors.

FIG. 2 is a plan view of FIG. 1.

FIG. 3 is an enlarged fragmentary view particularly illustrating the spring arrangement of the rear axle of the truck and the bracket and equalizer bar for the tag axle mechanism.

FIG. 4 is an enlarged fragmentary view similar to FIG. 3 and illustrating the tag axle mechanism attached to the rear axle.

FIG. 5 is a side view of the tractor and bed in position for attachment of the tag axle mechanism.

FIG. 6 is an enlarged perspective view of the tag axle mechanism.

FIG. 7 is a cross-sectional view taken on a line 7—7, FIG. 4.

FIG. 8 is a cross-sectional view taken on a line 8—8, FIG. 4.

FIG. 9 is an enlarged perspective iew of the equalizer bracket.

FIG. 10 is a side view of the loading and supporting frame for the first tractor over the cab of the truck.

FIG. 11 is an end view showing the track for the front wheels and the adjustability thereof.

1 generally designates a tag axle arrangement embodying the features of my invention for attachment to a truck 2 having front wheels 3 and rear wheels 4, a chassis 5, a frame 6 mounted on the chassis to extend rearwardly of the cab 7 and may have a tiltable platform or bed 8 which includes a subframe 9 pivotally secured at 10 to the frame 6, the bed 8 being movable on the frame 9 as hereinafter described. An approach plate 11 is provided and pivotably attached as indicated at 12 to the rear end of the bed as illustrated in FIG. 5 and which may also be utilized for raising of the rear wheels 4 from the ground when the tag axle is to be attached to the truck as later described.

The subframe 9 includes channel-shaped side members 14 and 15 and extending outwardly from the web portions of said channel members are shafts 17 and 18 upon which are mounted a plurality of spaced rollers 19 and 20 for engagement in channel-shaped members 21 and 22 carried by the underneath side of the bed 8 as illustrated in FIG. 7. The purpose of this roller arrangement is to form trackways in which the rollers engage and whereby the bed 8 may be moved rearwardly on the subframe 9 and the main chassis frame 6 by hydraulic cylinders 23, one situated on each side of the frame of the bed operable from the fluid supply of the motor from the motor as is the usual practice, this fluid being supplied by manipulation of valves as indicated at 25 (FIG. 1) and having line attachment as indicated at 26 to the lines 27 attached to the hydraulic cylinders as shown in FIG. 5. The front end of the subframe 9 may be moved upwardly and bed 8 is moved rearwardly to load the tractors from a ground level and then forwardly so that the front portion will assume its normal position as shown in FIG. 1 after loading.

As is the usual practice the frame 6 of the chassis is supported upon a pair of transversely spaced semi-elliptical spring assemblies 30. The forward ends of each of the spring assemblies 30 is pliably connected by shackles 31 attached to the frame 6 as is the usual practice. A load bearing axle 32 is located under the springs 30 intermediate the ends thereof and mounts the pneumatic tire assemblies 4. The axle 32 is secured to the springs 30 by a plurality of spaced U-bolts 33 which encircle and encompass the axle 32 and the assemblies of the springs 30. Suitable pads 34 and 35 are provided with each pair of U-bolts associated with one of the springs 30 to properly space and align the same with pads 36 acting as a bearing surface for the nuts 37 of the U-bolts. The spring assembly includes between the pads 34 and 35 smaller springs 38 having the ends of the top leaf 39 adapted to engage stop members 40 and 41 as is the usual practice.

The frame 6 of the truck includes U-shaped side channel members 42 and 43 and rigidly secured thereto by welding or other suitable means on each side of said frame are brackets or hanger elements 44 and 45 having an open forward portion and an open rearward portion as illustrated in FIG. 9. The depending brackets or hanger elements 44 and 45 include side members 46 and 47 having aligned openings for receiving the ends of removable shafts 48 on which are mounted sleeves 49. Detachable equalizer bars 50 are pivotally mounted on the shafts 48 and comprise spaced side members 51 and 52 having aligned openings at the upper center thereof as indicated at 53 (FIG. 3) for receiving the shaft 48. The equalizer bars 50 have forwardly extending arms 54 and rearwardly and downwardly extending arms 55. The forwardly extending arms have a cross plate 56 extending between the plates 51 and 52 and slightly forward and below the sleeve 49 on the shaft 48. The rearwardly extending arms 55 of the side members 51 and 52 have aligned openings for receiving a pin or bolt 57. These brackets or hanger members 44 and 45 are identical on each side of the truck bed. The inside plate 46 has a laterally extending arm 58 and a strut 59, the arm 58 lying under the U-shaped channel members 42 and 43 and secured thereto to strengthen the device.

The subframe 9 includes U-shaped side channel members 60 and 61 secured to the U-shaped channel members 14 and 15 by bolts or the like 62 and 63. Rigidly secured to the outside of the channel shaped members 60 and 61 are depending brackets 64 and 65 including spaced arms 66 and 67 and rigidly mounted between the arms 66 and 67 are bars 68 and 69 and spacer members 70 and 71 are provided and rigidly secured on the inside of the arm 67.

The tag axle assembly 1 comprises an axle 72 and mounted thereon are dual wheels 73 and 74, leaf springs 75 and 76 are provided adjacent the respective wheels and are secured to the axle by U-shaped bolts 77 having a pad 78 on the upper leaf 79 of the springs and a plate or pad member 80 on the lower side of the axle 72. Plate members 82 are provided underneath the pad 81 and through which the lower ends of the U-bolts extend and which are held in place by nuts 83. The plates 82 include spaced forward extending ears 84 and pivotally attached thereto by bolts 85 are connecting bars 86 and 87 having connecting members 88 and 89 for securing to rearwardly extending connectors 90 (FIG. 4) which in turn are connected by links 91 to the U-shaped bolts 33 which secure the spring assembly 30 to the regular axle 32 of the truck.

When the tag axle mechanism is secured in place as indicated in FIG. 4, the rear end 92 of the upper leaf 79 of the springs 76 engage under the bar 69 of the depending brackets 64 and 65. The forward ends 93 of the springs engage under the bolts or pins 57 of the equalizer bars 50 as shown on dotted lines in FIG. 4. The rear end 94 of the upper leaf 95 of the spring assembly 30 engages between the arms 51 and 52 of the equalizer bar and underneath the sleeve 49 on the shaft 48 when in the position as shown in FIG. 3. When the load is on the truck subframe, the main frame 6 will shift downwardly and the upper side face of the top leaf 95 of the spring assembly 30 will engage under the cross plate 56 extending between the arms 51 and 52 and particularly the forward portion 54 thereof as shown in FIG. 4. This is a shifting of the spring in relation to the load carried.

The apparatus shown in FIGS. 10 and 11 represents the tractor loading and retaining of the forward end of the first tractor above the cab 7 and consists of a framework 99 having spaced standards 100 and 101 having feet 102 and 103 secured to the floor or bed 8 by set bolts or the like 104 and 105. Brace members 106 and 107 have their lower ends secured to the side edge 108 of the bed 8 as indicated at 109 (FIG. 11). Spaced upwardly from the feet 102 and 103 of the framework structure is a cross member 110 having an upwardly extending flange portion 111 provided with spaced openings 112. A cross member 113 is provided for the standards and spaced from the top thereof. The upper portion 114 of the standards are provided with inwardly extending shafts 115 and 116 slidable in sleeves 117 and 118 secured directly to the standards as illustrated in FIG. 11. The sleeves are provided with openings 119 for receiving pins 120 and which extend through spaced openings 121 in the shafts 115 and 116 which are provided with spaced openings 124 and 125 for receiving bolts 126 and 127 for attachment of said bracket to the frame 128 of the tractor 129 when it is in place with the front end thereof above the cab of the tractor.

Spaced inclined trackways 130 and 131 are provided and extend at an angle from the standards 113 and 114 rearwardly to the platform as indicated at 133. The trackways are angle shaped with the vertical portion 134 to the outside and are bent and extend forwardly forming wheel supporting arms 135 and 135' forwardly of the standards 114 as illustrated in FIG. 10. Cross members 136 and 137 are provided to lend stability to the framework structure and struts 139 extend from the top of the standard 114 forwardly to the forward end of the trackways 133 and 134 forwardly of the standards and rearwardly thereof and are secured as indicated at 140 to the cross member 110 as illustrated in FIG. 10. The shafts 115 and 116 are adjustable to accommodate tractors with different width frames. The trackways 133 and 134 are provided with openings for receiving bolts 141 and 142 adapted to extend into the openings 112 and 112' in the cross member 110 to accommodate tractors with front wheels of different spaced apart areas.

When it is desired to place the tag axle arrangement 1 under the truck as herein assembled and described a block 150 may be placed on the ground rearwardly of the truck and the approach plate 11 rotated to a vertical position as indicated in FIG. 5. By manipulation of the control levers 125 the cylinders 26 are extended so that the truck platform bed is inclined at an angle and at the same time the rear of the truck and wheels will be raised off the ground also as shown in FIG. 5. The tag axle arrangement may then be rolled underneath the truck and the attaching arms 86 and 87 attached to the connecting members on the regular axle of the truck. The forward ends of the springs 75 are then engaged with the equalizer bar and the rear ends 92 of the spring 75 to the depending hanger or bracket 61 and underneath the bar 69 extending thereacross. The pistons in the cylinder may then be retracted through manipulation of the valves and the truck wheels lowered to the ground. The approach plate is then raised to be in parallel alignment with the bed 8. The bed may be rolled rearwardly of the subframe 9 by the usual means such as hydraulic cylinders or winch arrangement (not shown) so that the degree of angle of the bed to the truck body may be adjusted to suit the user. The truck is then ready for loading.

While my present invention is particularly adaptable for transporting of tractors on a truck, it will be obvious that any product may be transported and the tag axle arrangement used. When used for loading tractors the first tractor 160 may be driven onto the bed and the front wheels will approach the lower end 161 of the trackways 133 and 134. At that time the front tires 162 may be removed and stored on the truck bed as shown in FIG. 1. Removal of the tires is to prevent the greater angle of the truck in moving the same onto the framework structure 100. The tractor then may be driven with the rims 163 of the wheels engaging in the trackways and the front end 164 of the tractor will extend above the cab 7 as shown in FIG. 1 where it may be chained (not shown) to the structure to hold it rigidly in place. In order to place the weight of the tractor on the standards 100 and 101 of the structure, the brackets 122 and 123 are then secured to the side frame 128 of the tractor.

The second tractor 165 is then backed onto the bed 8 until it assumes the angle as shown in FIG. 2 with one wheel 166 just inside of one of the wheels 167 of the tractor 160. It is then securely fastened to the bed by chains or the like 168. The third tractor 169 is then driven onto the bed 8 in a forward position and substantially in a straight line but slightly to one side of the tractor 160 with the front ends thereof engaging against the side 170 of the tractor 165 and the rear wheel 171 as shown in FIG. 2. The approach plates may then be locked in parallel position as shown in FIG. 1 as is the usual practice and as shown in Patent No. 3,066,816 and the tractors chained to the bed by chain 173 or other suitable means.

In the event the equipment cannot be driven onto the platform or bed 8, a drum winch (not shown) or other similar equipment may be utilized and carried by the forward end of the platform to draw the equipment thereon. After the tractors are in place, the bed may be lowered by the hydraulic cylinders as heretofore stated and the truck is then ready for movement.

It will be noted that the connecting member 86 is cylindrical and is internally threaded as indicated at 176 and a threaded rod 177 extends thereinto, to which the connecting member 88 is attached. This is for the purpose of adjusting the wheels on the tag assembly with respect to the main wheels of the driving axle and to keep them in proper alignment.

It will be obvious from the foregoing that I have provided an improved tag axle mechanism for attachment to a truck for transporting tractors or the like or other products and for suspending the first tractor partially above the cab of the truck to conserve space on the bed thereof.

It will be further obvious that I have provided a simple and economical manner of supporting the tractor partially above the cab adjustable to suit different size tractors.

It is to be understood that while certain forms of this invention have been illustrated and described, it is not to be limited to the specific form or arrangement of parts herein described and shown except insofar as such limitations are included in the claims.

I claim:
1. A detachable load-bearing spring and axle assembly for trucks and the like, said truck having a live axle and transversely spaced spring assemblies for attachment to side members of the main frame of the truck having a subframe pivotally mounted on said main frame comprising,
    (a) spaced, forwardly extending arms carried by said detachable axle assembly,
    (b) means connecting the forward end of said arms to said live axle,
    (c) an equalizer bar,
    (d) means pivotally mounting said bar to each side member of the frame of the truck between said live and detachable axles,
    (e) a transverse pin rigidly carried by said equalizer bar rearwardly of said pivotal mounting means,
    (f) means carried by said subframe engaging the rear of the spring assembly of the detachable axle, the forward end of said last named spring assembly engaging said pin on said equalizer bar and the rear portion of the spring assembly on the live axle engaging said means pivotally mounting said equalizer bar.

2. A detachable load-bearing spring and axle assembly for trucks and the like, said truck having a live axle and transversely spaced spring assemblies for attachment to side members of the main frame of the truck having a subframe pivotally mounted on said main frame comprising,
    (a) spaced, forwardly extending arms carried by said detachable axle assembly,
    (b) means connecting the forward end of said arms to said live axle,
    (c) an elongated equalizer bar having spaced side members,
    (d) a shaft extending through said side members at substantially the longitudinal center thereof and through said side members of said frame pivotally mounting said bar to each side member of the frame of the truck between said live and detachable axles,
    (e) a pin rigidly mounted between said side members of the bar rearwardly of said shaft,
    (f) means carried by said subframe engaging the rear of the spring assembly of the detachable axle, the forward end of said last named spring assembly engaging said pin on said equalizer bar and the rear portion of the spring assembly on the live axle engaging said shaft pivotally mounting said bar.

3. A detachable load-bearing spring and axle assembly for trucks and the like, said truck having a live axle and transversely spaced spring assemblies for attachment to side members of the frame of the truck and having a bed extending rearwardly of said frame comprising,
    (a) spaced, forwardly extending arms carried by said detachable axle assembly,
    (b) means connecting the forward end of said arms to said live axle,
    (c) bracket members rigidly secured to the side members of the frame and having spaced sides,
    (d) an equalizer bar
    (e) means pivotally mounting said bar in said brackets between said live and detachable axles, said bar having spaced sides forming arms extending forwardly and rearwardly of said bracket members,
    (f) a pin rigidly mounted between said side members of the bar of the rearwardly arm,
    (g) means carried by said bed engaging the rear of the spring assembly of the detachable axle, the forward end of said last named spring assembly engaging said pin on said rearwardly extending arm of the equalizer bar and the rear portion of the spring assembly on the live axle engaging said pivotally mounting means of said bar.

4. The combination of claim 1 wherein the equalizer bar has forwardly and rearwardly extending portions and the means pivotally mounting the equalizer bar to the side members of the frame includes a shaft and the equalizer bar includes a plate member rigidly mounted on the forwardly extending arm of the equalizer bar between the side members of said bar, whereby weight on said truck will shift engagement of said spring assembly on the live axle from said shaft to said plate.

5. The combination of claim 1 wherein the means on the subframe for engaging the rear portion of the spring assembly on the detachable axle assembly are brackets depending from said subframe having plates against which said spring assemblies engage.

6. A detachable load-bearing spring and axle assembly for trucks and the like, said truck having a cab and having a live axle and transversely spaced spring assemblies for attachment to side members of the main frame of the truck and having a subframe pivotally mounted on said main frame comprising,
 (a) spaced, forwardly extending arms carried by said detachable axle assembly,
 (b) means connecting the forward end of said arms to said live axle,
 (c) an equalizer member pivotally mounted to each side member of the frame of the truck, between said live and detachable axles, said members having spaced sides,
 (d) a shaft extending between the sides of said equalizer members,
 (e) a pin rigidly mounted between said side members of the equalizer members rearwardly of said shaft,
 (f) means carried by said subframe engaging the rear of the spring assembly of the detachable axle, the forward end of said last named spring assembly engaging said pin on said equalizer members and the rear portion of the spring assembly on the live axle engaging said shaft pivotally mounting said equalizer members,
 (g) a bed slidably carried by said subframe,
 (h) means for tilting said subframe and said bed to lower the rear end of said bed to the ground for loading tractors thereon.
 (i) a frame structure carried by the forward end of said bed, said structure including spaced standards having their lower ends secured to said bed, brace means for said standards holding same in upright position, a cross bar between said standards above said cab, at least one trackway carried by said frame structure having an upper portion engaging said cross bar and its lower end engaging said bed spaced rearwardly of said standards, said trackway extending forwardly over said cab, whereby a tractor may be driven on to said bed and the front wheels engage said trackway to mount said tractor in an upwardly angled position with the rear wheels on the bed and with the front wheels over said cab, and
 (j) means carried by said standards and engageable with said tractor to place the weight of the forward end of the tractor on said standards when the forward end of the bed is lowered to normal transport position.

7. The combination of claim 6 wherein said frame structure on the front of the bed of the truck includes two trackways and means for adjusting said trackways to accommodate tractors with different width front wheels.

8. The combination of claim 7 wherein said means carried by the standards and engageable with the tractor to place a portion of the weight of a tractor on said standards is adjustable to fit the width of the tractor.

9. The combination of claim 7 wherein two additional tractors may be loaded on said bed with the body of the second tractor at an angle to the first tractor with one rear wheel of the second tractor between the wheels of the first tractor and the body of the third tractor is parallel with the first tractor and to the right side of the rear of the bed with the front wheels thereof adjacent the other rear wheel of the second tractor.

10. In combination with a vehicle having a load-bearing axle, a main frame and a subframe each having side members, said axle having a pair of transversely spaced elliptical springs having their forward ends engageable with said main frame, comprising,
 (a) an auxiliary axle and wheel assembly,
 (b) means attaching said auxiliary axle to said load bearing axle in trailing alignment therewith,
 (c) a pair of transversely spaced elliptical springs on said auxiliary axle,
 (d) shafts attached to and extending outwardly of said side members of the main frame between said axles,
 (e) an elongated equalizer bar on each side of said main frame pivotally mounted on said shafts at substantially the longitudinal center thereof, said bars including spaced side plates and forwardly and rearwardly extending portions and a cross plate rigidly secured therebetween forwardly and downwardly of said shaft, the rear ends of said springs on said load bearing axles engaging under said cross plates whereby said load on said vehicle will cause the engagement of the rear ends of the springs on the load bearing axle normally against said shafts to shift to said plates,
 (f) a pin extending between the sides of said equalizer bars rearwardly of said shaft engaging on said forward ends of springs on said auxiliary axle, and
 (g) means carried by the side members of said subframe engaging on the rear ends of said springs on said auxiliary axle, whereby the load on said vehicle will be equalized between the load-bearing axle and the auxiliary axle.

11. In combination with a vehicle having a load-bearing axle, a main frame and a subframe each having side members, said axle having a pair of transversely spaced elliptical springs having their forward ends engageable with said main frame, comprising,
 (a) an auxiliary axle and wheel assembly,
 (b) means attaching said auxiliary axle to said load bearing axle in trailing alignment therewith,
 (c) a pair of transversely spaced elliptical springs on said auxiliary axle,
 (d) shafts attached to and extending outwardly of said side members of the main frame between said axles,
 (e) an elongated equalizer bar on each side of said main frame pivotally mounted on said shafts at substantially the longitudinal center thereof, said bars including spaced side plates and forwardly and rearwardly extending portions and a cross plate rigidly secured therebetween forwardly and downwardly of said shaft, the rear ends of said springs on said load bearing axles engaging under said cross plates,
 (f) means carried by said equalizer bars rearwardly of said shaft engaging on said forward ends of springs on said auxiliary axle, and
 (g) means carried by the side members of said subframe engaging on the rear ends of said springs on said auxiliary axle, whereby the load on said vehicle will be equalized between the load-bearing axle and the auxiliary axle,
 (h) said subframe of the truck being pivotally mounted on the rear end of the main frame and having a bed movable rearwardly and forwardly thereon, and

9

(i) means on said main frame having connection with the subframe for tilting said subframe and bed thereon for loading said bed.

12. The combination of claim 11 wherein the truck includes a cab portion and the bed includes a frame structure carried by the forward end of said bed having a portion extending over said cab portion when the truck is in transport position and said frame structure receives a part of the load on said bed.

References Cited by the Examiner

UNITED STATES PATENTS

| | | | |
|---|---|---|---|
| 2,665,142 | 1/1954 | Talbert | 220—104.5 |
| 3,177,003 | 4/1965 | Tantlinger | 280—104.5 |

FOREIGN PATENTS 1,101,986  3/1961  Germany.

BENJAMIN HERSH, *Primary Examiner.*

P. GOODMAN, *Assistant Examiner.*